Feb. 23, 1960

M. SCHWARTZ ET AL 2,925,753

SOUND PROJECTOR

Filed Jan. 27, 1956

INVENTORS
MORRIS SCHWARTZ
EDWARD K. KAPRELIAN

BY Hane and Nydick

ATTORNEYS

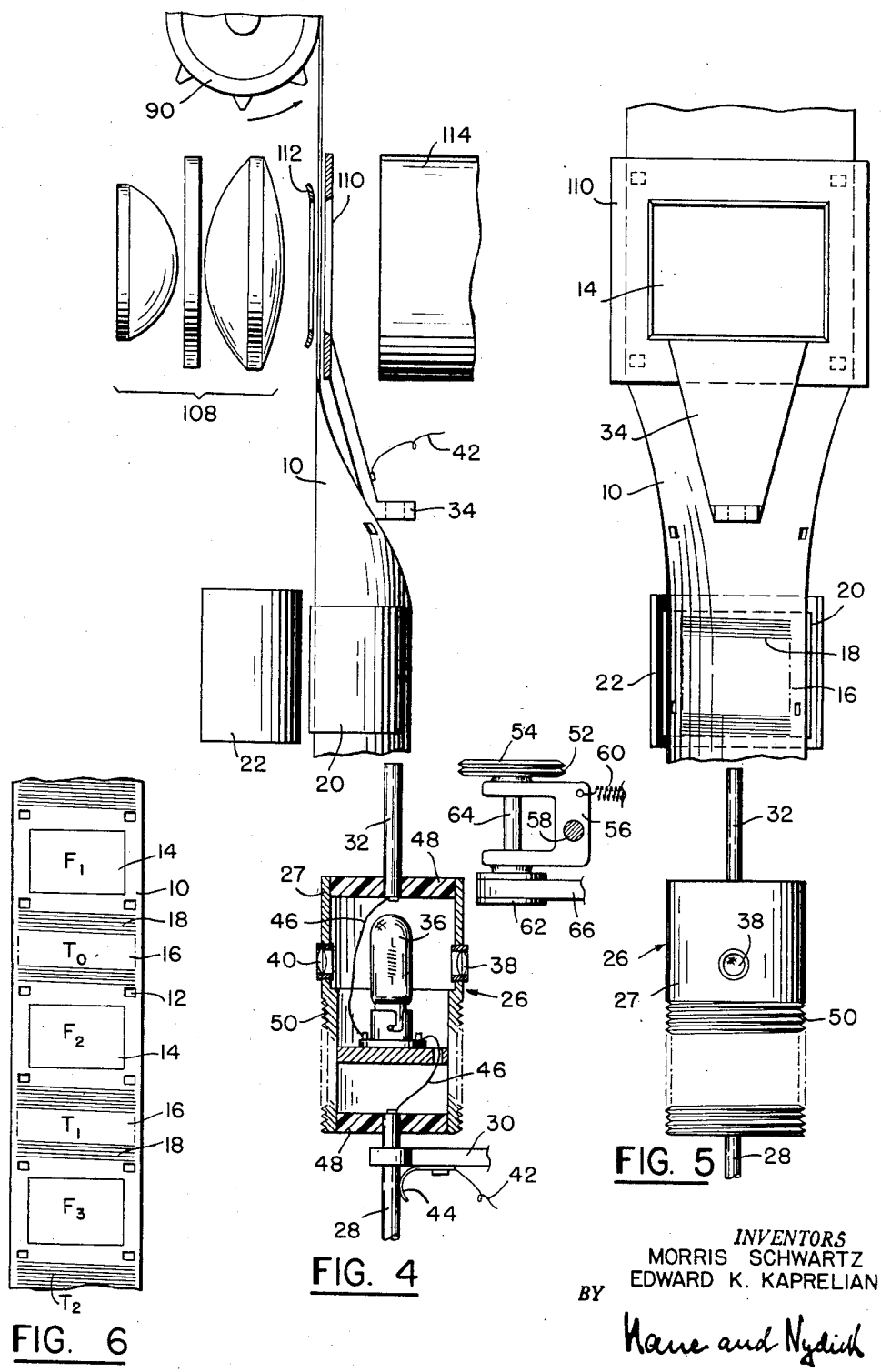

Feb. 23, 1960 M. SCHWARTZ ET AL 2,925,753
SOUND PROJECTOR
Filed Jan. 27, 1956 5 Sheets-Sheet 3
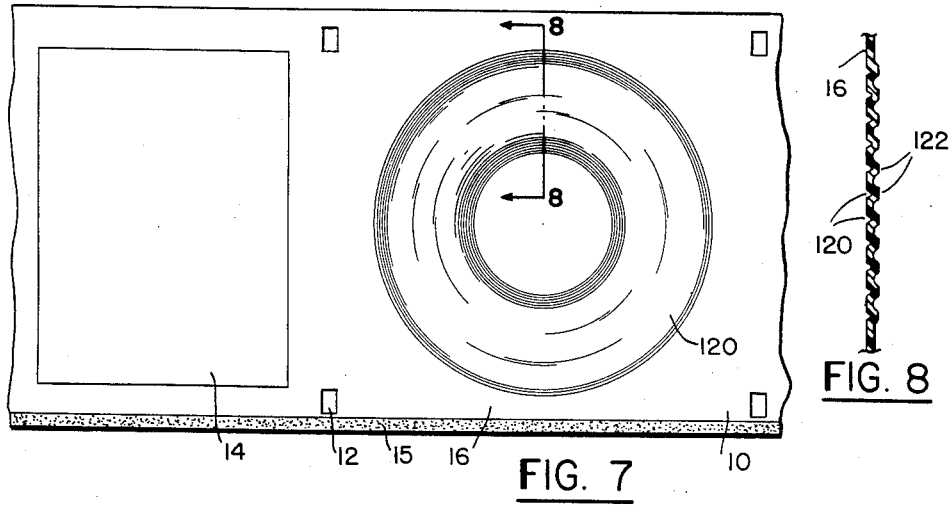
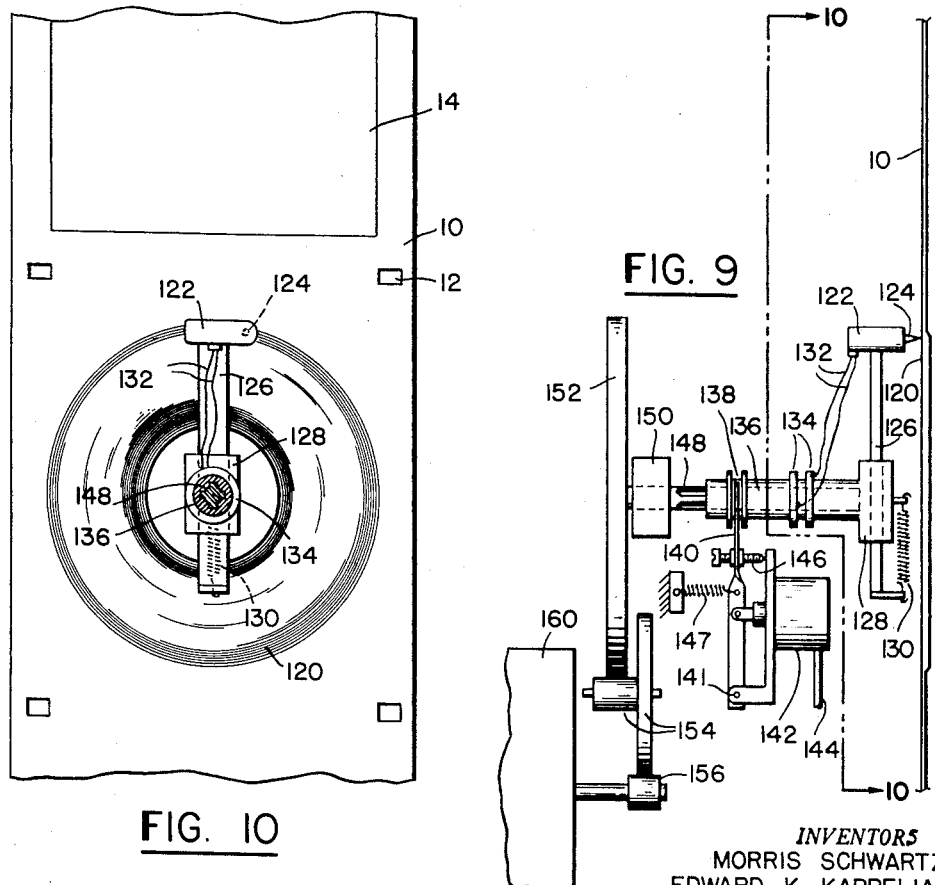
INVENTORS
MORRIS SCHWARTZ
EDWARD K. KAPRELIAN
BY
Hane and Nydick
ATTORNEYS Feb. 23, 1960  M. SCHWARTZ ET AL  2,925,753
SOUND PROJECTOR
Filed Jan. 27, 1956  5 Sheets-Sheet 4

INVENTORS
MORRIS SCHWARTZ
EDWARD K. KAPRELIAN
BY
ATTORNEYS

Feb. 23, 1960     M. SCHWARTZ ET AL     2,925,753
SOUND PROJECTOR

Filed Jan. 27, 1956     5 Sheets-Sheet 5

INVENTORS
MORRIS SCHWARTZ
BY EDWARD K. KAPRELIAN

ATTORNEYS

United States Patent Office 2,925,753
Patented Feb. 23, 1960

2,925,753
SOUND PROJECTOR

Morris Schwartz and Edward K. Kaprelian, Plainville, Conn., assignors to The Kalart Company Inc., Plainville, Conn.

Application January 27, 1956, Serial No. 561,891

13 Claims. (Cl. 88—28)

The present invention relates to an apparatus for simultaneously projecting a still photograph and reproducing a recorded message pertaining thereto.

While a projected still photograph, as any picture, is to a certain extent self-explanatory, additional information or comment pertaining to the picture is often necessary or at least desirable. This is not only true for still photographs of a technical, scientific or promotional nature, but also for pictures of a more personal interest. The enjoyment of viewing pictures will often be greatly increased by an accompanying comment on the situation or location depicted on the picture.

While movie film with sound track is in general use by both professionals and amateurs, there are not available as far as the applicant is aware, means for directly associating a still photograph and a recorded sound message other than those described in co-pending application Serial No. 442,362, filed July 9, 1954, by the inventors herein.

In the aforesaid application a device is described in which a photographic transparency or slide is associated with a recorded message by providing a common holder for the slide and the sound track carrier, and the holder is positioned for simultaneous projection and sound reproduction by suitable projecting and reproducing equipment respectively.

One of the objects of the present invention is to provide means which permit simultaneous projection and sound reproduction with greater convenience than heretofore possible.

Another object of the invention is to provide a novel and improved apparatus which is designed for the use of strip film bearing both, a picture frame and the associated message instead of a separate slide and sound track carrier held in a common holder thereby not only simplifying the showing of "talking still photographs," but also facilitating the preparation of the material to be shown and reducing the cost of the same. The use of strip film having thereon picture frames and associated recorded messages in longitudinal disposition also affords the advantage that several programs to be successively shown may be provided on one strip, each program consisting of one picture and the associated recorded message.

Still another object of the invention is to provide a novel and improved apparatus which is equipped with means for moving a picture and the associated recorded message into the operative position, reproducing the message while projecting the picture, automatically shutting off the apparatus at the end of the message, and readying the apparatus for projecting another picture and reproducing the associated recorded message.

Other and further objects, features and advantages of the invention will be pointed out hereinafter and set forth in the appended claims forming part of the application.

In the accompanying drawings, several preferred embodiments of the invention are shown by way of illustration and not by way of limitation.

In the drawings:

Fig. 1 is a plan view of a strip film bearing a picture area and a linear photographic sound track area longitudinally spaced from the picture area.

Fig. 2 is an elevational side view of part of the projecting equipment and of the sound reproducing equipment of an apparatus according to the invention, utilizing the strip film of Fig. 1.

Fig. 3 is a plan view taken on line 3—3 of Fig. 2.

Fig. 4 is a view, partly in section, of some of the components shown in Fig. 2 and of additional components of the apparatus.

Fig. 5 is a fragmentary front view of Fig. 4.

Fig. 6 is a plan view of a modification of strip film suitable for use in an apparatus according to Figs. 2 to 5.

Fig. 7 is a plan view of still another strip film using a mechanical sound track.

Fig. 8 is a section taken on line 8—8 of Fig. 7 on an enlarged scale.

Fig. 9 is an elevational side view of a sound reproduction head utilizing the film of Figs. 7 and 8.

Fig. 10 is a front view taken on line 10—10 of Fig. 9 on an enlarged scale.

Figure 12:
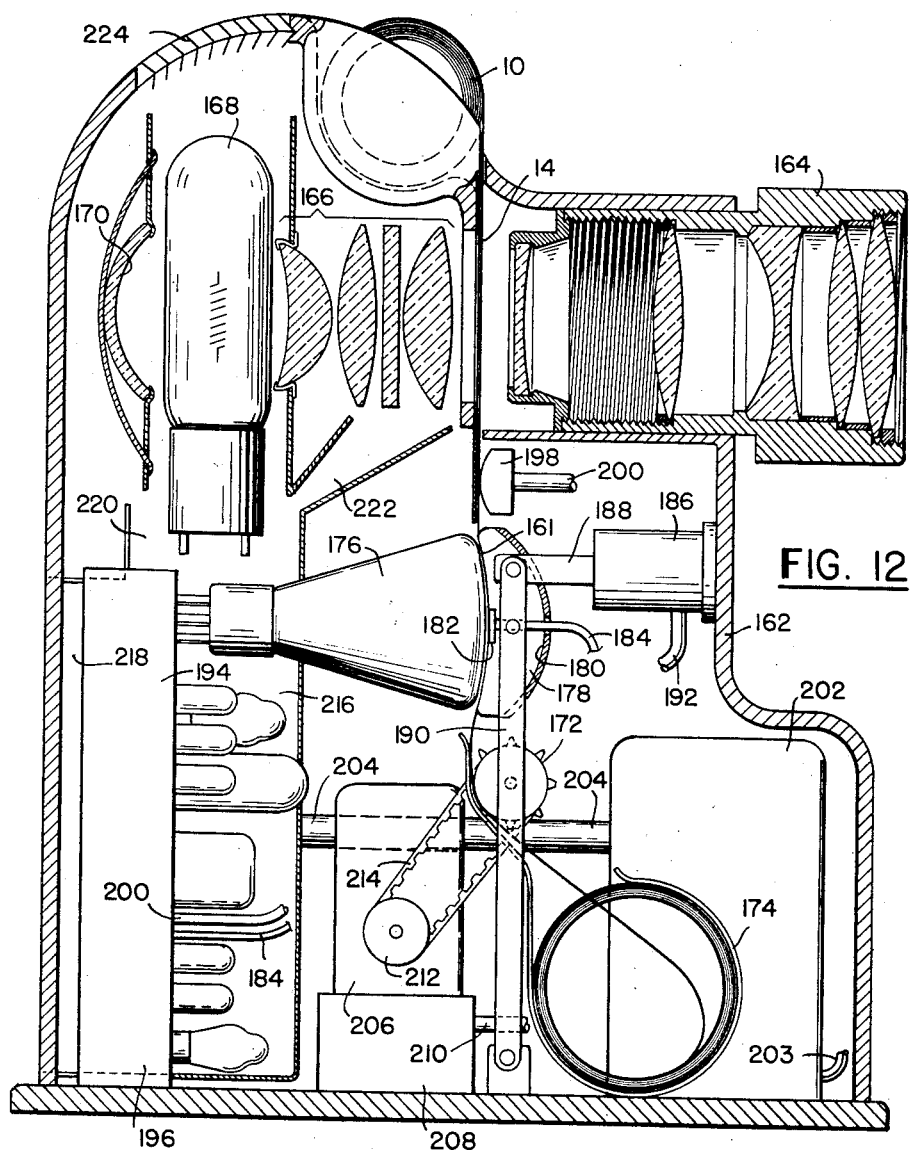
Fig. 12 is an elevational view, partly in section, of a modification of an apparatus according to the invention, utilizing the film of Fig. 11.

Referring first to Figs. 1 through 5, in detail, Fig. 1 shows a strip of film 10 provided with spaced perforations 12, a picture area 14 and a sound track area 16. The sound track area includes a number of inclined parallel lines 18 representing sound recording, in this case, of a photographic nature. The sound area 16 is associated with picture area 14 in that the recorded message or intelligence pertains to the picture presented in the picture area. As is apparent, the sound area is longitudinally spaced from the picture area and each two cooperating areas thus formed on a strip of film constitute a program. Several such programs may be provided on a strip of film as will be more fully explained hereinafter.

As is shown in Figs. 2 through 5, the film is guided and retained by suitable guide and retaining means (not shown in Figs. 2 through 5) in a position in the apparatus such that the picture area 14 is positioned about the optical axis of the projecting equipment. The area receives light from a lamp (not shown) and a condenser system 108, and is in the focus of a projection lens 114.

In order to reproduce the recorded sound, the sound track area 16 is bent to a cylindrical shape by a transparent film guide 20, behind which a photocell 22 is mounted. The output of the photocell is fed through a cable 24 to a conventional amplifier (not shown). A scanning head, generally designated by 26 cooperates with the sound track area by scanning the lines 18 thereon. Head 26 comprises a cylindrical body supported at its lower end by a rod 28 and at its upper end by a rod 32. Rod 28 is slideably guided in a sleeve 30 and rod 32 in a sleeve 34. The scanning head includes a lamp 36, the filament of which is imaged by a pair of diametrically oppositely placed lenses 38 and 40. The power for operating the lamp is supplied through wires 42, brushes 44, shafts 28, 32 and wires 46. The end walls 48 of the cylindrical body 27 of head 26 are made of insulation material to permit use of rods 28 and 32 as electric conductors. The outside of the cylindrical body is formed with circumferential threads 50 which cooperate with peripheral grooves 52 of a spring-pressed driving wheel 54. Wheel 54 is mounted on a shaft 64 supported by a yoke 56 pivotal about a pivot 58 and restrained in clockwise direction by a spring 60. The end of shaft 64 opposite to wheel 52 seats a pulley 62 which cooperates with a belt 66, a second pulley 68 and an idler 70. Idler 70 is mounted on a shaft 72 which is pivotal about a pivot 74.

The position of idler 70 and with it the tension of belt 66 are controlled by the state of energization of a solenoid 76 which is connected to a source of power by a cable 77. When the solenoid is de-energized, the plunger of the solenoid permits idler 70 to occupy a position in which belt 66 is slack and the tension of spring 60 pulls wheel 54 into a position in which the grooves 52 thereon are disengaged from threads 50.

Figs. 2 and 3 show solenoid 76 in its energized state. As a result, the solenoid pulls idler 70 against belt 66 thereby overcoming the restraining action of spring 60 and placing the grooves 52 of wheel 54 in driving engagement with threads 50. At the same time, the tensioning of the belt causes rotation of pulley 68 to be transmitted to pulley 62.

Pulley 68 is seated on a shaft 78 and is driven through a speed reduction gear 80 from a motor 82 which receives its power through a cable 84.

Advancement of film 10 fed into the apparatus and into the aforedescribed position or out of the same is effected by rotation of a sprocket wheel 90 engaging perforations 12 of the film. Sprocket 90 co-acts with an idler gear 92, a Maltese cross mechanism 94 and 96, a belt 98, a pulley 100 and a clutch operated drive mechanism 102. Mechanism 102 is driven by motor 82 through shaft 78. Actuation of the clutch is controlled by the state of energization of a solenoid 104 powered through a cable 106. When the solenoid 104 is energized, the clutch is in engagement thereby causing the aforedescribed advancement of the film. The picture area of the film is held flat against a gate 110 by a pressure plate 112.

The operation of the apparatus as hereinbefore described, is as follows:

Solenoid 104 is operated resulting in an advancement of the film to projecting and reproducing stations respectively of the apparatus. Thereupon, solenoid 76 is actuated resulting in tightening of belt 66 and engagement of grooves 52 of wheel 54 with the threads 50 on the cylinder 37 of scanning head 26. As a result, the scanning head rotates and also climbs due to the engagement of grooves 52 and threads 50. Light passing through lenses 38 and 40 scans successive lines 18 of sound area 16 thereby reproducing the recorded message. When and while the message is reproduced the picture is projected through the aforedescribed optical system. At the end of the message, solenoid 76 is de-energized with the result that belt 66 slackens. Accordingly, spring 60 rotates yoke 56 in a clockwise direction whereby grooves 52 are disengaged from threads 50 and the scanning head 26 falls back into its initial position by its own weight.

The de-energization of solenoid 76 may be effected automatically or through a manual switch. Furthermore, the operation of solenoid 104 may be coupled with the control of solenoid 76 so as to make the operation of the device fully automatic. Interlocking and coupling of switches controlling successive operations are well known in the electric art so that a detailed description of an arrangement of this kind does not appear to be essential for the understanding of the invention.

In order to provide adequate or even ample working space between the projecting aperture of the apparatus and the location of the sound pick-up head and more efficiently to utilize the film area, it is sometimes advantageous to stagger the picture frames and the sound track areas as shown in Fig. 6. This figure has interposed between a picture area $F_1$ and the associated sound track area $T_1$ another picture area $F_2$ and a sound track area $T_0$ associated with a picture area not shown in Fig. 6. Similarly, a picture area $F_3$ is interposed between the sound track area $T_1$ and the sound track area $T_2$ associated with picture area $F_2$.

Fig. 7 shows a strip 10 which in addition to picture areas 14 and sound track areas 16 has along one of its margins a sound track 15 for the purpose of identifying and/or selecting the programs to be shown. The sound area representing the recorded message to be reproduced comprises a sound track of the mechanically embossed type. A sound track of this kind may be produced by forcing a heated master die into the film base to form lateral sound grooves. As a result, the opposite side of the film may have raised ridges as shown at 122 in Fig. 8.

Figs. 9 and 10 show the sound reproducing equipment utilizing a film as shown in Figs. 7 and 8. In Figs. 9 and 10, it is assumed that the picture area is correctly located in the projector gate and that the sound track 120 is properly oriented, preferably through the use of perforations 12, with a pick-up cartridge 122 and its needle 124. The pick-up cartridge or head 122 is attached to an arm 126 which, in turn, is slideably guided in a boss 128. The head is urged by a spring 130 to occupy a position outside the peripheral outline of the generally circular sound track 120. The output of head 122 is fed through wires 132 to commutator rings 134 seated on a sleeve-like member 136 extending from boss 128. The output of the head is picked up from commutator rings 134 by suitable brushes and fed to a conventional amplifier, not shown. Sleeve 136 mounts a grooved collar 138. The groove of the collar is engaged by a yoke 140 pivotal about a pivot 141. The position of yoke 140 is controlled by the state of energization of the plunger of a solenoid 142 power for which is obtained through wires 144. An adjustable stop 146 limits the travel of the yoke arm in clockwise direction when solenoid 142 is energized. The yoke is restored to its initial position by being turned in counterclockwise direction by a spring 147 upon deenergization of solenoid 142.

Sleeve 136 is seated on a shaft 138 axially slideable but secured against rotation by the use of splines or similar means. Shaft 148 serves to rotate sleeve 136 and with it pick-up head 122. To this end it is rotatably supported in a bearing 150 and seats a friction drive wheel 152 which is driven through friction pulleys 154 and 156 by a motor 160. Of course, a gear drive or any other suitable drive may be employed instead of the friction drive.

The operation of the equipment shown in Figs. 9 and 10 and described in connection therewith, is as follows:

Film 10 is moved into position, that is, the picture area is located as described in connection with Figs. 2 through 5 and the sound track is positioned as shown in Fig. 9. The means for transporting the film may be the same as previously described.

Assuming that the film is in position and that motor 160 is running, sound head 122 rotates about the track, but its needle 124 is out of engagement with the sound grooves due to the action of the restoring spring 147. When it is now desired to start the production of the message, solenoid 142 is energized. As a result, needle 124 is moved into engagement with the outermost groove of track 120 due to the axial pull applied to sleeve 136 by the plunger of energized solenoid 142. As head 122 continues to rotate about the track, its needle is gradually moved inwardly until it reaches the last or innermost track in which it continues to idle. When at this point solenoid 142 is deenergized by any suitable means such as manual switch means, independent timing means, or switch means actuated by the position of head 122, the action of spring 147 withdraws needle 124 from the sound track and the action of spring 130 restores the head into the position shown in Figs. 9 and 10.

Figure 11:
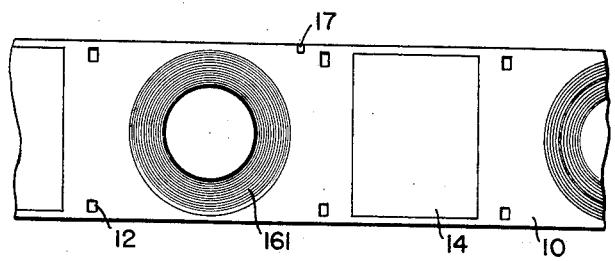
Fig. 11 is a plan view of a further strip film arrangement suitable for use in an apparatus according to the invention, the film utilizing a spiral photograph film track.

The strip film of Fig. 11 is similar in principle to the previously described arrangements except that its sound track 161 is in the form of a spiral photographic recording of the variable slit or variable width type.

Fig. 12 shows a substantially complete apparatus suitable for use of the type of film shown in Fig. 11. The apparatus comprises a casing 162 in which is adjustably mounted the lens system 164. A strip of film 10 which contains successive programs, distributed for instance, as shown in Fig. 6 is wound up and positioned at the top of the apparatus. The film is threaded into the apparatus so that one of its picture areas 14 is properly oriented in the gate where lens system 164 receives light from a condenser system, 166, lamp 168 and reflector 170. The associated sound track areas 161 is positioned simultaneously at the sound pick-up station of the apparatus.

The film is automatically moved into the proper projecting and pick-up positions respectively by a sprocket 172 operated by drive means which subsequently will be described. The film is wound as shown in a receptacle 174 in a manner which is well known.

The sound track area 161 receives its light from a scanner tube 176 in which the flying spot is so timed and programmed as to follow the spiral of the sound track. The light passing through the track is picked up by a solid reflector element 178, preferably made of glass or a suitable acrylic or similar resin and provided with a reflecting surface 180. Surface 180 directs the incident light to a photoelectric cell 182 disposed at the front of reflector element 178. The output of the cell is fed by a cable 184 to an amplifier 196. The amplifier may constitute a section of a power supply 194 which powers tube 176.

To move pick-up element 178 out of the way of the path of the advancing film, the element is mounted on a lever 190 pivoted to a plunger 188 of a solenoid 186 supplied with power through a cable 192. The energization of solenoid 186 is controlled by any suitable means such as a conventional sequencing switch.

To permit skipping of a picture area and the associated sound area which are not to be shown to the audience, a head 198 is provided which picks up suitable signals such as shown at 17 along the edge of the film of Fig. 11 or in the sound strip 15 of the film of Fig. 7. Output of head 198 is led through a cable 200 to amplifier 196 and from there to the aforementioned sequencing switch controlling solenoid 186.

The transport of the film through the apparatus by means of sprocket 172 is powered by a motor 202 which is connected to a source of power through a cable 203 and drives a shaft 204. Rotation of this shaft is transmitted through a reduction gear 206, a pulley 212 and a belt 214 to a pulley secured to sprocket 172. The drive of sprocket 172 is controlled by a clutch preferably disposed in the housing of reduction gear 206. The clutch, in turn, is controlled by a solenoid 208 which is energized through a cable 210 when it is desired to advance the film into the position for the selected next program.

Shaft 204 further drives a blower 216 which draws in air through an inlet 218. The cooling air is directed around the lamp through an outlet 220 and upon the film through an outlet 222. A preferably louvered vent 224 at the top of housing 162 permits escape of the heated air.

Figure 13:
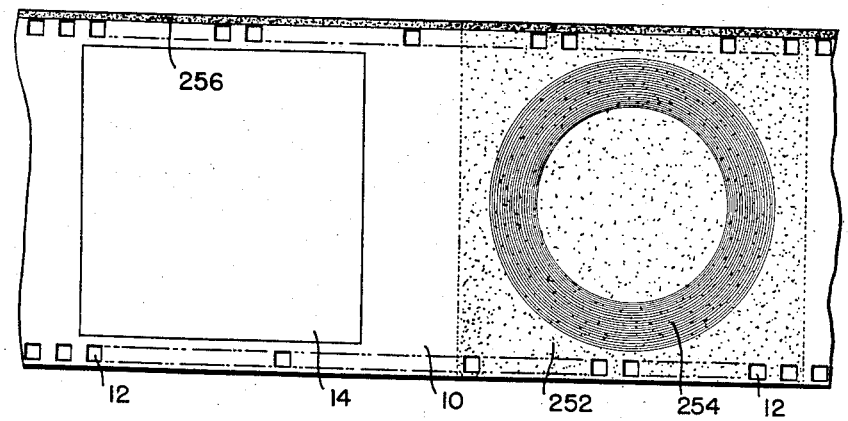
Fig. 13 is a plan view of still another strip film, the film utilizing a spiral magnetic sound track.

Fig. 13 shows a film having perforations 12, a picture area 14 and a sound track area 252. The sound track area is coated with magnetic recording material on which a magnetic spiral sound track 254 has been recorded. An additional magnetic stripe 256 is provided along one edge for the purpose of producing sequencing signals in the event selection among the programs on the film is desired.

Figure 15:
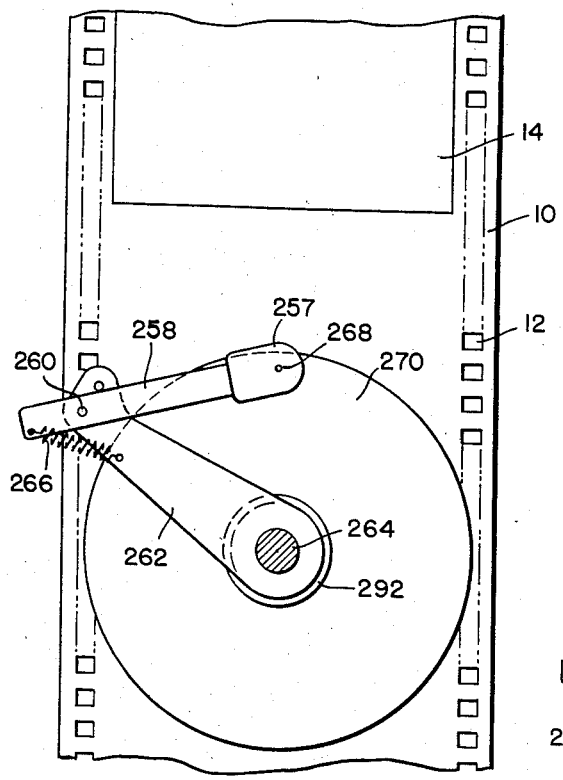
Fig. 15 is a section taken on line 15—15 of Fig. 14.
Figure 14:
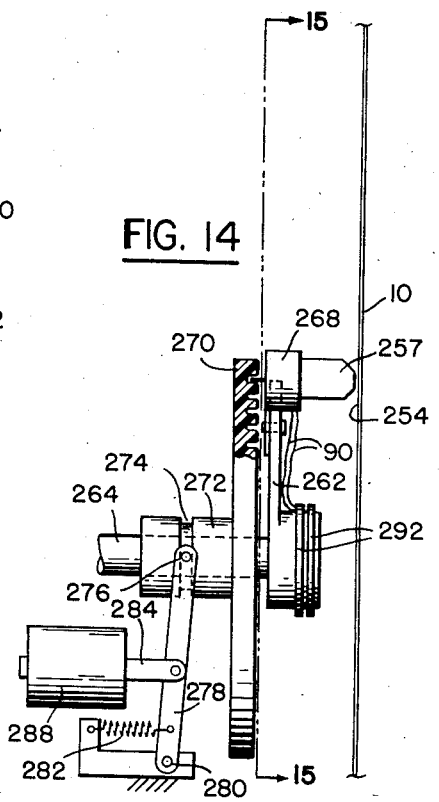
Fig. 14 shows a sectional view of the pick-up head arrangement suitable for sound reproducing equipment utilizing the film of Fig. 13.

Figs. 14 and 15 show a pick-up head suitable for utilizing the film of Fig. 13.

The pick-up head comprises a magnetic pick-up 257 which must be properly oriented with the periphery of the recording area, preferably through registry with the appropriate perforations of the film. Pick-up 257 is supported on an arm 258 pivoted at 260 to a drive arm 262 fixedly seated upon a drive shaft 264. A spring 266 biases pick-up 257 into its outermost position shown in Figs. 14 and 15. The top of pick-up 257 carries a pin 268 which cooperates with grooves in a rotating disc 270 made for instance, of plastic. Disc 270 is attached to or integral with a hub 272 which is seated on shaft 264 freely rotatable and axially slideable thereon. Hub 272 has a peripheral groove 274 engaged by pin 276 on the end of a yoke member 278 pivoted at 280. Yoke 278 is normally biased into a counter-clockwise direction by a spring 282, but can be rotated clockwise by means of a plunger 284 of a solenoid 288.

The output of pick-up 257 is carried through wires 290 to commutator rings 292 from which it is picked up by suitable brushes and fed to a conventional amplifier.

When the apparatus is started for showing one program or several programs in succession, shaft 264 rotates continuously driven by a motor similar to the one described in connection with Fig. 12, but pick-up 257 is out of engagement with the sound grooves by the action of spring 282 which pulls the assembly towards the left as shown in Fig. 14. When it is desired to commence the reproduction of the message, solenoid 288 is energized whereby disc 270 is pressed against pick-up 257 causing the pick-up to move against the film. At the same time, the head is caused to follow the spiral path of the sound track by the co-action of pin 268 and the grooves. Upon completion of the reproduction, solenoid 288 is de-energized, either manually or automatically, permitting pick-up 257 to return into its initial position by the action of springs 266 and 282.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A sound projector for projecting a still photograph and reproducing recorded intelligence associated therewith, said sound projector comprising, in combination, projecting means for projecting a photographic transparency, sound reproducing means for reprdoucing intelligence recorded on a sound track, a strip film having thereon at least one picture area and an associated sound track area longitudinally spaced one from the other, guide means for guiding said strip film into and stationarily retaining the same in a position in which said picture area and said sound track area are located in operational relationship with the projecting means and the sound reproducing means respectively, means for actuating said sound reproducing means to reproduce the intelligence recorded on said sound track area while the film is stationary, means for deactivating the sound reproducing means, and means for readying the said sound reproducing means for a subsequent reproduction upon completion of a reproduction, said deactivating means being coupled with said readying means to effect actuation of the latter means when the deactivating means are operated.

2. A sound projector for projecting a still photograph and reproducing recorded intelligence associated therewith, said sound projector comprising, in combination, projecting means for projecting a photographic transparency, sound reproducing means for reproducing intelligence recorded on a sound track, a strip film having thereon several longitudinally alternating picture areas and sound track areas, each sound track area being associated with one picture area to constitute a program, said picture areas and the associated sound track areas all being disposed in the same spatial relationship on the film, guide means for guiding said strip film successively into positions in which a selected associated picture and sound track area are located in operational relationship with the projecting means and the sound reproducing means respectively and stationarily retaining the selected associated areas in said operational relationship, means for actuating said sound reproducing means to reproduce the intelligence recorded on the respective sound track area while the film is stationary, means for deactivating said actuating means upon completion of the recorded intelligence associated with one program, means for readying said sound reproducing means for a subsequent reproduction upon completion of a reproduction, and coupling means coupling said deactivating means with said readying means to effect operation of both said means upon operation of the deactivating means.

3. A sound projector for projecting a still photograph and reproducing recorded intelligence associated therewith, said sound projector comprising, in combination, projecting means for projecting a photographic transparency, sound reproducing means for reproducing intelligence recorded on a sound track, said sound reproducing means including a pick-up head movable between a starting position at the beginning of a reproduction and an end position at the completion of the reproduction and biased to return into the starting position, a strip film having thereon at least one picture area and an associated sound track area longitudinally spaced one from the other, guide means for guiding said strip film into and stationarily retaining the same in a position in which said picture area and said sound track area are located in operational relationship with the projecting means and the sound reproducing means respectively, and control means coacting with said pick-up head for moving the latter into operational engagement with said sound track area and withdrawing the head from said engagement at the end of a reproduction, thereby releasing the head for return into the starting position by said bias.

4. A projector according to claim 3, wherein said pick-up head is disposed perpendicularly movable from a low starting position into a raised end position, and wherein said control means comprise drive means engageable with said head for moving the latter from its low position into its raised position, and actuating means for moving the drive means into and out of engagement, disengagement of the drive means causing the pick-up head to return into its starting position by its own weight.

5. A projector according to claim 3, wherein said pick-up head and said drive means comprise threads engaging each other upon actuation of the drive means, engagement of said threads causing the head to climb into its raised end position.

6. A projector according to claim 5, wherein said sound track area comprises a recording in the form of inclined parallel lines, said coacting threads imparting to the head a combined rotary and climbing motion, and wherein said pick-up head comprises photocell means scanning said lines during said combined motion of the head.

7. A projector according to claim 3, wherein said sound track area comprises a spirally grooved sound track, said pick-up head being mounted rotatable about the axis of the sound track and movable radially to said axis between a radially outer position juxtaposed the outermost groove of the track and a radially inner position juxtaposed the innermost groove of the track, said pick-up head being further displaceable in the direction of said axis and biased into a position disengaged from said sound track, and wherein said control means comprise actuating means coacting with said pick-up head for biasing the latter into operative engagement with the sound groove upon actuation of the actuating means, said engagement guiding the pick-up head from its outer position to its inner position, and yieldable means returning the pick-up head into its outer position upon de-actuation of the actuating means.

8. A projector according to claim 3, wherein said sound track area comprises a spiral sound recording line, said pick-up head being mounted rotatable about the axis of the recording and movable radially to said axis to move the head from a position coacting with the outer beginning of the recording line to a position coacting with the inner end thereof, and wherein said control means comprise a movable guide means including a spiral guide groove engageable with said pick-up head for guiding the latter along said recording line, yieldable means biasing the guide means out of engagement with said pick-up head, and actuating means coacting with said guide means for moving the latter into engagement with said pick-up head for the purpose aforesaid.

9. A projector according to claim 8, wherein said pick-up head is supported on an arm pivoted to a second arm rotatable about the axis of said spiral recording line to cause said combined rotary and radial motion of the pick-up head, and wherein said guide means comprises a rotary shaft coaxial with said axis and a disc seated on said shaft rotatable and axially displaceable thereon, said actuating means being engageable with said disc for moving the latter into engagement with said head against the action of said yieldable means.

10. A projector according to claim 2, wherein said sound reproducing means include scanning tube means having a flying light spot adapted to scan the sound recording on said sound track area, photo-electric means disposed to be actuated by light received from said scanning tube means, and electronic sound amplifying means connected in an energizing circuit with said photo-electric means for actuation thereby.

11. A sound projector according to claim 10, wherein said photo-electric means comprise a photocell and a reflector disposed to reflect light incident from said scanning tube means upon the photocell, said photocell and said reflector being mounted for joint movement between a position of coaction with a positioned sound track area and a withdrawn position, said latter position providing space for movement of the film through the projector, and wherein said actuating means coact with the photocell and the reflector for jointly positioning the same.

12. A projector according to claim 11, wherein said strip film has thereon several picture areas and several sound track areas each of the latter being associated with one of said picture areas, respective associated picture and sound track areas being disposed on the film in the same spatial relationship, and wherein said guide and retaining means successively guide associated picture and sound track areas into operational relationship with the projecting means and the sound reproducing means respectively and retaining the respective associated areas in said position, said guide and retaining means being coupled with said actuating means for actuating the same to move the photo-electric means into said position clearing a path for the advance of film through a projector.

13. A projector according to claim 12, wherein said film further has indicia thereon, each of said indicia pertaining to an associated picture area and sound track area, and wherein pick-up means selectively responsive to said indicia are provided to select certain of said associated areas for projection and sound reproduction respectively.

References Cited in the file of this patent

UNITED STATES PATENTS

| | | |
|---|---|---|
| 1,466,750 | Peterson | Sept. 4, 1923 |
| 1,679,708 | Bullis | Aug. 7, 1928 |
| 2,136,209 | Finch | Nov. 8, 1938 |
| 2,144,738 | Musemeci | Jan. 24, 1939 |

FOREIGN PATENTS

| | | |
|---|---|---|
| 323,039 | Great Britain | Dec. 17, 1929 |
| 337,151 | Great Britain | Oct. 30, 1930 |
| 569,103 | Germany | Jan. 28, 1933 |